Jan. 4, 1944. W. SCHAELCHLIN 2,338,545
SPEED CONTROL SYSTEM
Filed Aug. 5, 1941

WITNESSES:
E. A. McCloskey
Wm. J. Ruano

INVENTOR
Walter Schaelchlin
BY
Paul E. Friedman
ATTORNEY

Patented Jan. 4, 1944

2,338,545

UNITED STATES PATENT OFFICE 2,338,545

SPEED CONTROL SYSTEM

Walter Schaelchlin, Wilkinsburg, Pa., assignor to Westinghouse Electric & Manufacturing Company, East Pittsburgh, Pa., a corporation of Pennsylvania Application August 5, 1941, Serial No. 405,475

3 Claims. (Cl. 172—274)

My invention relates to a speed control system for an alternating-current motor. More specifically, it relates to the provision of liquid rheostats, having a wide resistance range, which are particularly useful for varying the speed of a variable torque induction motor.

An object of my invention is to provide a speed control system for an alternating-current motor which includes a secondary resistance having a wide range of values, so as to make it possible to obtain motor speeds as low as 16% full load speed and at the same time provide a smooth change of resistance throughout the entire speed range.

A more specific object of my invention is to provide a secondary resistance for a secondary winding of an alternating-current motor, which resistance comprises two liquid rheostats connected in series, one having a relatively small cross-sectional area and the other having a relatively large cross-sectional area, each effecting speed control within the different range of speeds.

Figure 1:
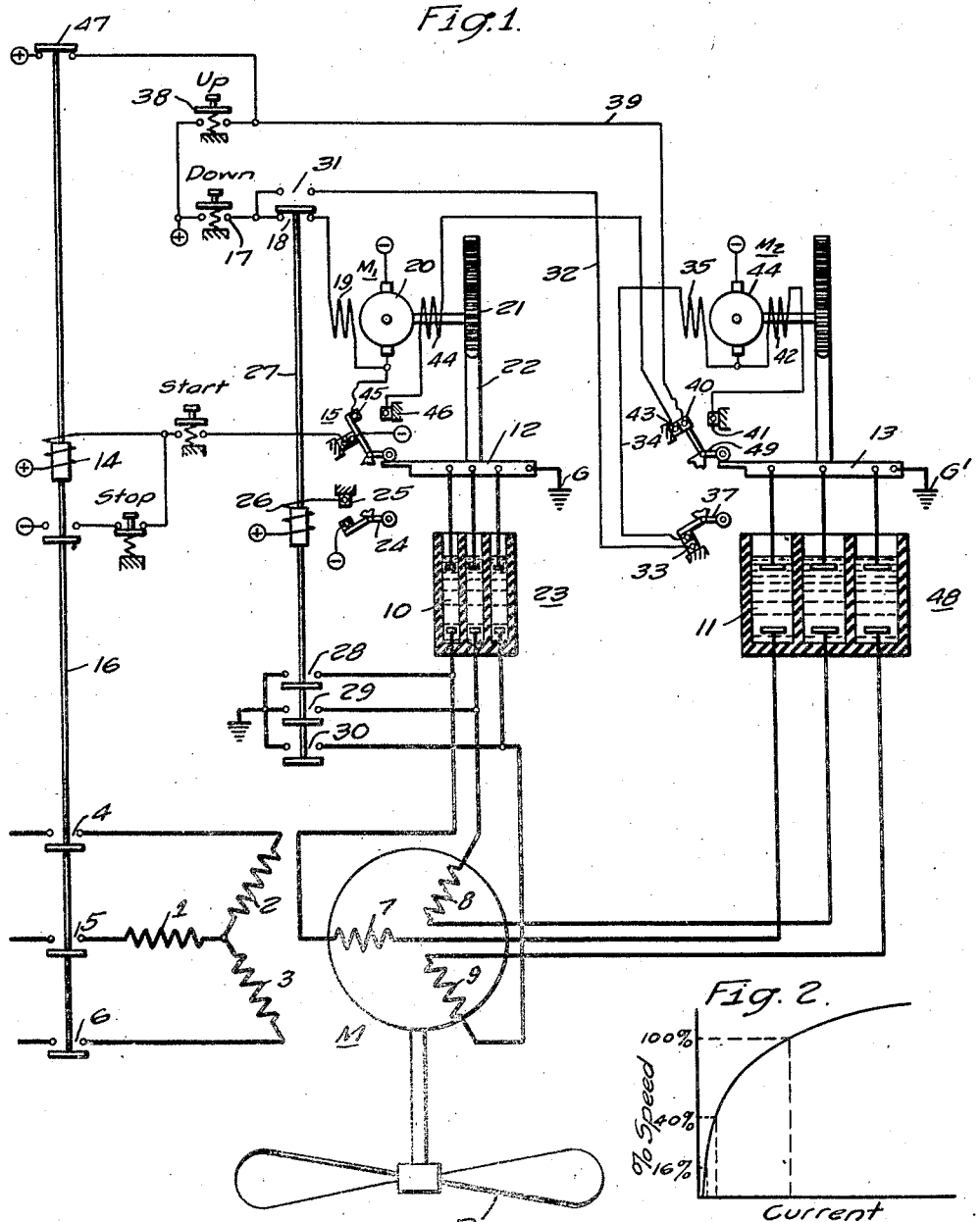
Figure 2:
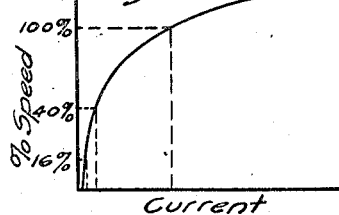

Other objects and advantages will become more apparent from a study of the following specification when considered in conjunction with the accompanying drawing, in which:

Figure 1 is a schematic showing of a control system embodying the principles of my invention; and Fig. 2 shows the relationship between percentage speed and current (or torque) of the motor shown in Fig. 1.

Referring more particularly to Fig. 1, the reference character M denotes a motor having primary windings 1, 2, and 3 energized by a suitable source of alternating-current potential (not shown) through the contact members 4, 5, and 6 of a main circuit breaker. Numerals 7, 8, and 9 denote secondary windings of the motor M which have their terminals connected to slip rings (not shown). The secondary windings are electrically separated and insulated from one another. A three-phase winding is shown, but it will be readily apparent that any number of phases may be used instead. The motor drives a propeller P suitable, for example, for a wind tunnel drive, in which application a wide range of speed is desirable. Of course, the motor may drive any other load other than a fan wherein a wide speed range is desired.

Across each of the secondary windings 7, 8, and 9 there is connected a secondary resistance comprising a high resistance liquid rheostat and a low resistance liquid rheostat connected in series. For example, across the secondary winding 7 there is connected a high resistance liquid rheostat leg 10 and a low resistance liquid rheostat leg 11, which are connected in series through the common operating elements 12 and 13 which are connected to grounds G and G'. Thus, it will be seen that across each of the secondary windings there is connected in series a pair of liquid rheostats, one having a large cross-sectional area and the other having a small cross-sectional area, so as to provide low and high increments of resistance variations, respectively. The liquid rheostats may have any suitable electrolyte, such as sodium carbonate. The area of low resistance rheostat such as 11 is considerably greater than the area of the high resistance liquid rheostat 10, preferably being of the order of 6 to 1.

The control system embodying my invention may be best understood from the following description of the operation thereof. Assume that the parts are in the position shown in the drawing. Let us now assume that the "start" push button is depressed, thereby completing an energizing circuit from the terminal (+) through actuating coil 14 through the "start" push button contact members and contact members 15 to the terminal (—). Such terminals (+) and (—) denote a suitable source of energizing potential, such as a direct-current source. The contactor 16 will thus operate, thereby effecting closing of the main circuit breaker contact members 4, 5, and 6, thereby applying alternating-current energy to the primary windings 1, 2, and 3 of motor M. The full value of secondary resistance of the liquid rheostats is in series with the secondary windings 7, 8, and 9 at this point. Hence, the motor will be brought up to a very low speed, say, about 16% full load speed.

When it is desired to increase the motor speed, the "down" push button is depressed, thereby closing contact member 17 and completing an energizing circuit from the terminal (+) through the contact members 17, contact members 18, field winding 19 and armature 20 of the motor M₁ to the terminal (—). This will energize motor M₁ so as to rotate pinion 21 and move rack 22 downwardly, carrying with it the operating element 12 and the various movable electrodes of the liquid rheostats in the high resistance liquid rheostat assembly 23. When the movable electrodes of the high resistance liquid rheostat assembly 23 come into contact with the lower or stationary electrodes, the left end of element 12 will operate a limit switch 24, turning it clockwise, thereby effecting closing of contact members 25, thus completing an energizing circuit through actuating coil 26 of contactor 27. Upon operation of contactor 27, the short-circuiting contact members 28, 29, and 30 will effect shunting out of the liquid rheostat assembly 23, thereby preventing possible arcing between the movable and stationary electrodes thereof. At this point, about 40% full load speed has been attained.

Operation of contactor 27 will also effect closing of contact members 31, thereby effecting completion of an energizing circuit which may be traced from the (+) terminal through the contact members 17 and 31, conductor 32, contact members 33, conductor 34, and the field winding 35 and armature 36 of motor $M_2$ to the (—) terminal. Motor $M_2$ will similarly drive the operating elements 13 downwardly and effect downward movement of the movable electrodes up to the point at which they contact the stationary electrodes, at which time the limit switch 37 is operated by element 13, effecting opening of contact members 33 and interruption of the energizing circuit for motor $M_2$.

If at this point it is desired to decrease the speed instead of increasing the same, the "up" push button is depressed, thereby closing contact members 38 and completing an energizing circuit extending from the (+) terminal through the "up" push button contact members 38, conductor 39, contact members 40 and 41, field winding 42 and armature 44 of the motor $M_2$ to the (—) terminal. This will effect energization of motor $M_2$ in an opposite direction, thereby causing upward movement of the element 13 and of the movable electrodes connected thereto. This will continue until the left end of element 13 operates limit switch 49 and interrupts contact members 40 and 41, but closes contact members 40 and 43, thereby completing an energizing circuit extending through winding 44 of motor $M_1$, thereby effecting upward movement of the movable electrodes of the liquid rheostat assembly 23. This upward movement will continue until the motor circuit is interrupted at contact members 45 and 46. Thus, it will be seen that the liquid rheostat members are automatically operable in succession.

If there is a voltage failure while either or both of the resistance assemblies is in an intermediate position, thereby causing the dropping out of contactor 16, contact members 47 will close, thereby effecting shunting of the "up" push button contact members 38, which will have the same effect as if the "up" push button were held down, that is, it will successively restore both rheostat assemblies to the "full resistance in position"—in other words, in the position in which the movable electrodes are uppermost.

Fig. 2 shows the relationship between speed and current (or torque) of the motor. It is known that torque is a function of the square of the speed or a function of current. It will thus be apparent that for the speed range between 16% and 40% full speed, the armature current is relatively small, whereas from 40% to 100% speed, the armature current is excessive. This makes it very expedient to use the high resistance liquid rheostat assembly 23 for operating within the speed range between 16% and 40% since only small currents are handled, and using the low resistance or high current capacity liquid rheostat assembly 48 for operating between 40% and 100% speed where high currents are handled, thereby efficiently using the respective rheostat assemblies and obtaining a smooth change of speed all the way from 16% to 100%. This has outstanding advantage over the use of rheostat assemblies of the same resistance value, since the latter has the disadvantage of using unnecessarily cumbersome rheostats and at the same time failing to provide smooth and wide changes of resistance values for operating through a sufficiently wide speed range.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims and such prior art that may be pertinent.

I claim as my invention:

1. A speed control system comprising, in combination, an alternating current motor having polyphase primary and secondary windings, a source of alternating current for said primary windings, a pair of liquid rheostats connected in series circuit relationship with each of said secondary windings, one of said rheostats being of relatively small cross sectional area and low current carrying capacity for controlling the motor within a low speed range and the other rheostat being of relatively large cross sectional area and high current carrying capacity for controlling the motor within a high speed range, the phases of said secondary windings being in separate electrical circuits, insulated from one another, each of said rheostats having a plurality of sets of relatively movable and stationary electrodes, each phase of said secondary windings having its terminals connected in series to one of said electrodes in each of said rheostats, the electrodes not so connected having connections with a ground.

2. A speed control system comprising, in combination, an alternating-current motor having primary and secondary windings, a source of alternating current for said primary winding, a pair of liquid rheostats connected in series circuit relationship with said secondary winding, one of said rheostats being of relatively small cross-sectional area and low current carrying-capacity for controlling the motor within a low speed range and the other rheostat being of relatively large cross-sectional area and high current-carrying capacity for controlling the motor within a high speed range, each of said rheostats having a movable electrode and a stationary electrode, said secondary winding having its terminals connected to one of said electrodes in each of said rheostats, the electrodes not so connected having connections completing a loop circuit for said secondary winding.

3. A speed control system comprising, in combination, an alternating-current motor having primary and secondary windings, a source of alternating current for said primary winding, a pair of liquid rheostats for said secondary winding, one of said rheostats being of relatively small cross-sectional area and low current-carrying capacity for controlling the motor within a low speed range and the other rheostat being of relatively large cross-sectional area and high current-carrying capacity for controlling the motor within a high speed range, each of said rheostats having a movable electrode and a stationary electrode, and means connecting the terminals of said secondary winding with said electrodes to provide loop circuits enabling said rheostats to control said motor over their respective speed ranges.

WALTER SCHAELCHLIN.